June 3, 1958  W. C. TRAUTMAN ET AL  2,837,222
TRANSMISSION JACK
Filed Sept. 15, 1951  4 Sheets-Sheet 3
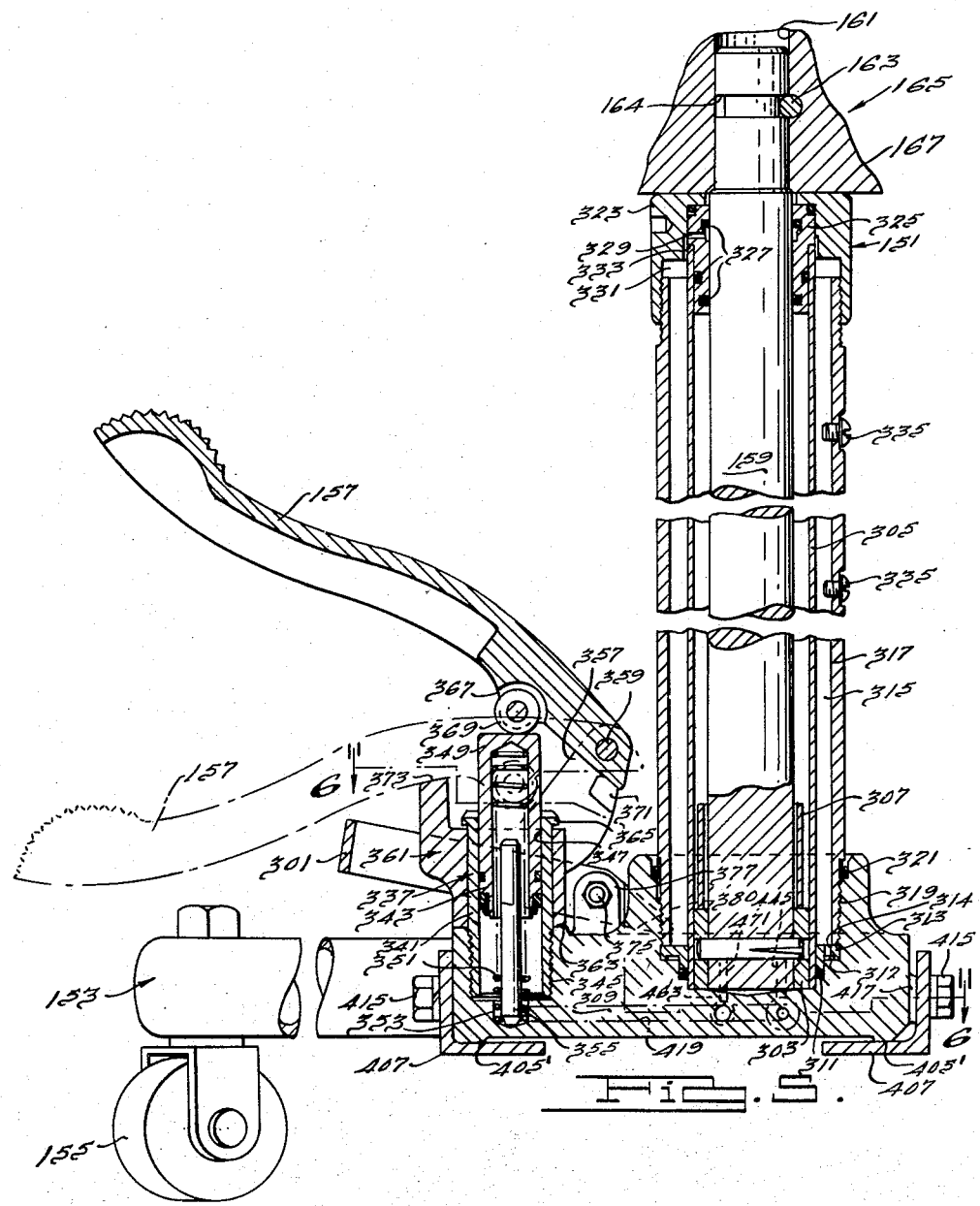
INVENTORS.
Walter C. Trautman,
Robert W. McNabb,
BY
Harness, Dickey & Pierce
ATTORNEYS.

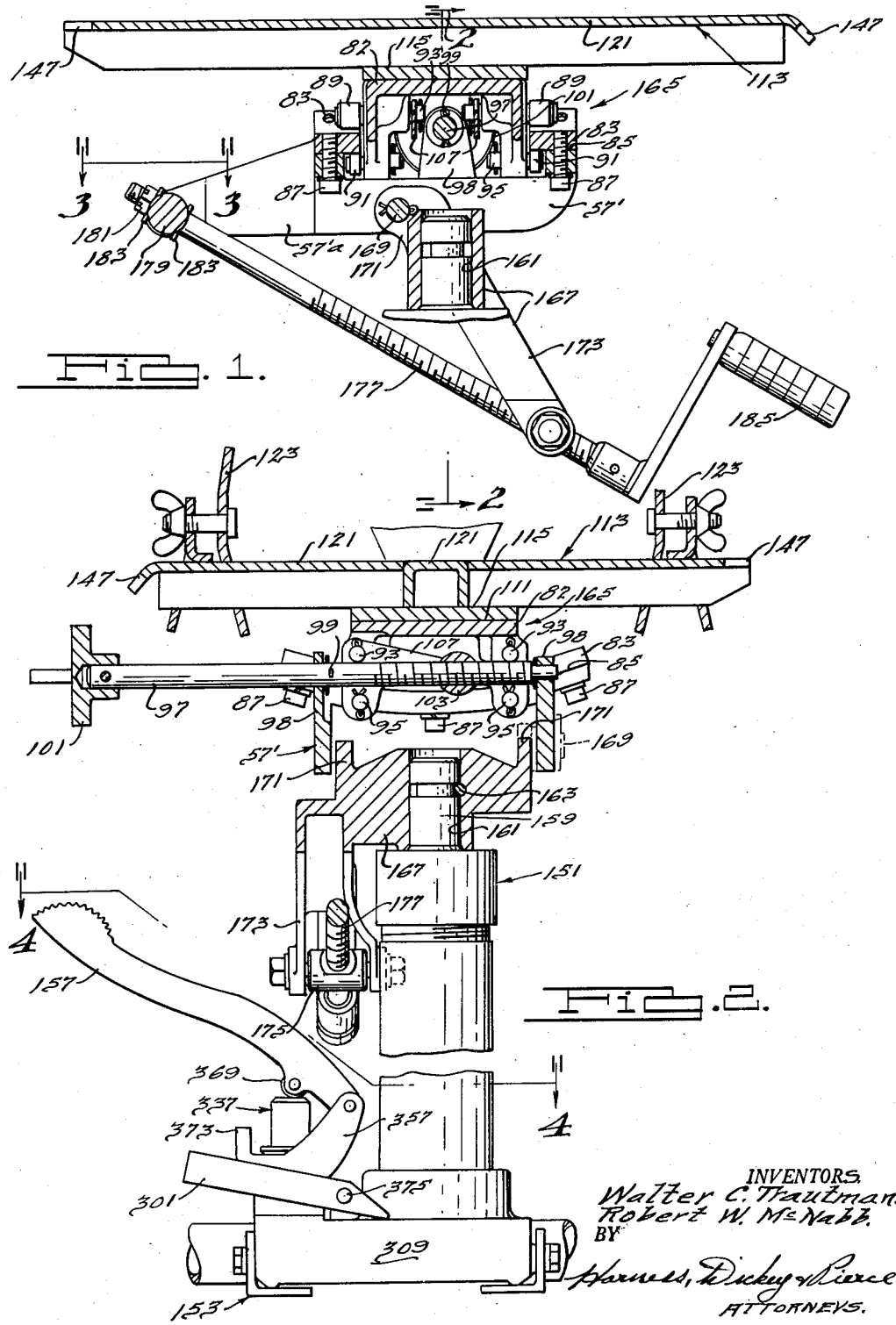

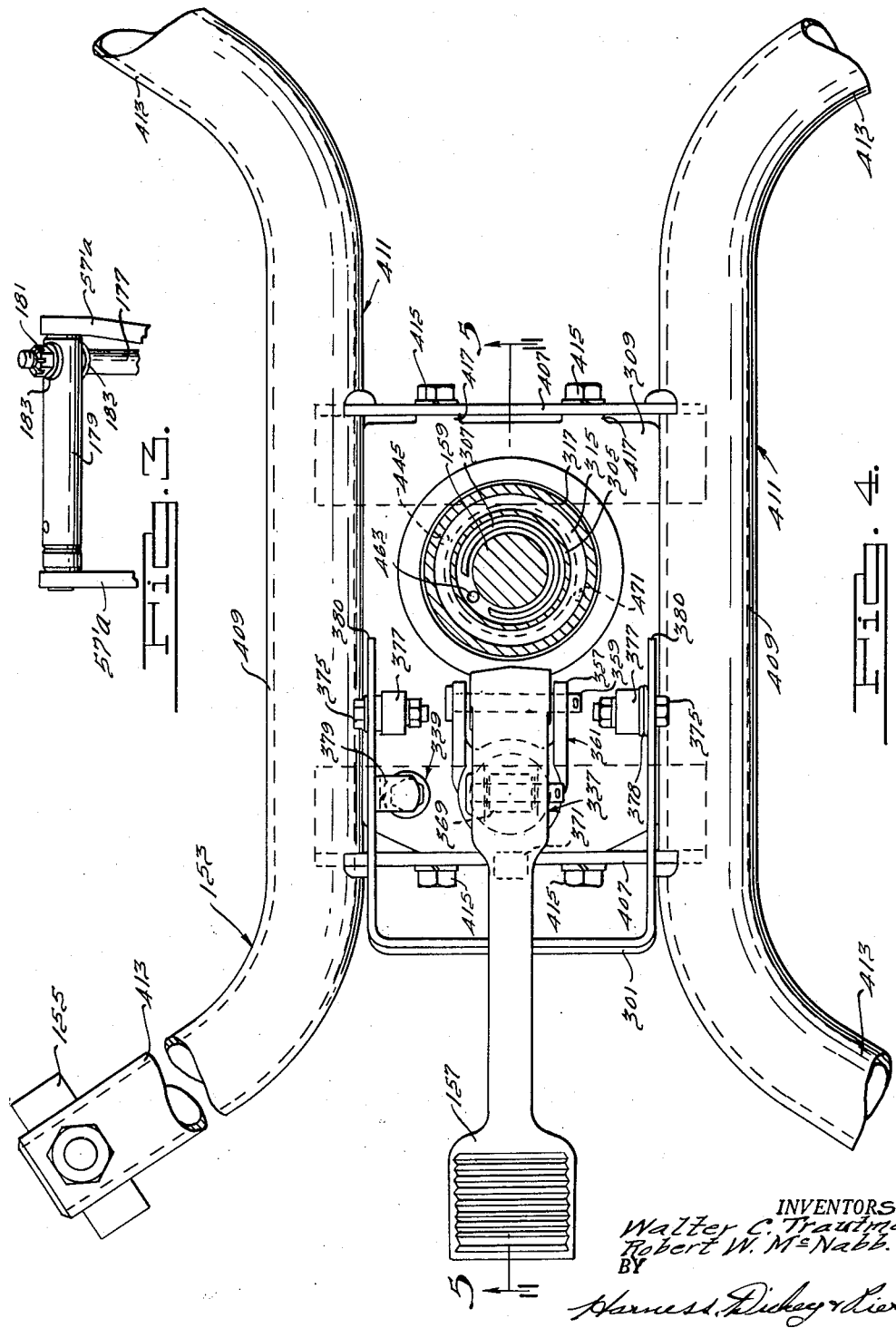

June 3, 1958    W. C. TRAUTMAN ET AL    2,837,222
TRANSMISSION JACK
Filed Sept. 15, 1951    4 Sheets-Sheet 4
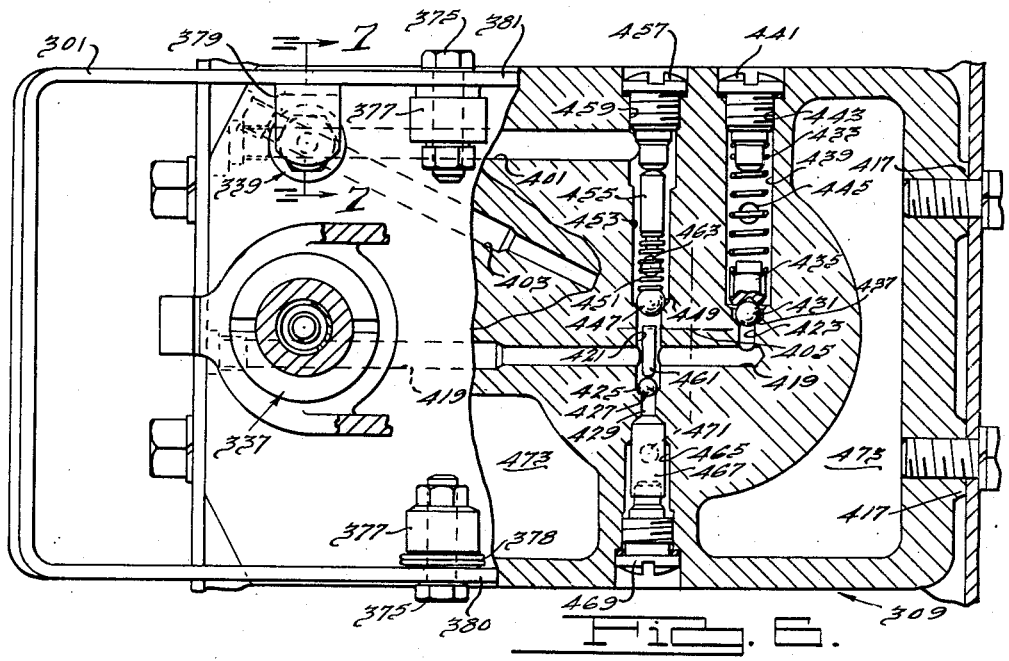
INVENTORS.
Walter C. Trautman,
Robert W. McNabb.
BY
Harness, Dickey & Pierce
ATTORNEYS.

United States Patent Office 2,837,222
Patented June 3, 1958

2,837,222

TRANSMISSION JACK

Walter C. Trautman and Robert W. McNabb, Racine, Wis., assignors to Walker Manufacturing Company of Wisconsin, Racine, Wis., a corporation of Wisconsin Application September 15, 1951, Serial No. 246,762

6 Claims. (Cl. 214—1)

This invention relates to lifting devices, and in particular, to jacks for removing and installing transmissions and lifting objects of various shapes.

The present application concerns an improvement on the invention disclosed and claimed in a copending application, assigned to the assignee of the present invention, of Walter C. Trautman and Lyle L. Arnes, entitled "Transmission Jack," Serial No. 224,311, filed May 3, 1951, now Patent No. 2,706,052. The copending application discloses a mobile jack having a saddle or cradle which is raised and lowered by mechanical means and which can be tilted at various angles to the vertical as well as rotated about a generally horizontal axis spaced above the cradle. The present invention is concerned with the use of hydraulic means to raise and lower the saddle described in the copending application and resides in modifications of the saddle to adapt it to the use of such hydraulic means as well as in certain features of construction of the hydraulic means which, in combination with the saddle, produce a jack that possesses very desirable characteristics for certain special applications, such as the installation and removal of automatic transmissions.

Prior to the invention described in this and the copending application, the removal and installation of automatic transmissions for automobiles was a difficult and awkward task regardless of how many men undertook it. It was necessary then to manually handle the transmission and, because of its weight and peculiar shape, extreme effort, time, and patience were required to do the job safely and without damage to the operators or the transmission unit. The invention makes this a fast, safe, one-man job. It provides a machine which carries the transmission and has all the necessary movements to remove or install it. Manual handling of the transmission is eliminated and an operator now needs only to operate a machine or jack constructed in accordance with the invention.

The prior application disclosed the invention in a form which is particularly adapted to handle transmissions in automobiles that are substantially on the floor of the garage and in one commercial form has a pick-up height of from about one-half a foot to three feet. The jack of the present invention is designed to have a pick-up height above this range, it being especially intended for use in removing or installing transmissions from automobiles that are elevated on garage lifts to a height permitting the operator to walk beneath them. It includes a hydraulic lifting ram unit that is mounted on a wide and therefore stable base which is also mobile. The lifting ram includes concentric cylinder and reservoir tubes which are arranged to take bending loads such as may occur when the center of gravity of the transmission carried is offset from the axis of the ram. The ram is actuated by a foot pump which has an actuating lever that swings through a wide angle to permit it to be easily reached by an operator. The pressure release valve is also foot-operated by movement of a lever that can likewise be reached from positions covering a wide angle about the axis of the ram. A head similar to the one of the prior application and including the adjustable saddle is swivelly mounted on the top end of the ram by a special feature of the present invention which includes means for tilting the saddle at an angle to the vertical.

Other features of the invention will be apparent upon consideration of an illustrative embodiment of the invention which is shown in the accompanying drawings and wherein:

Figure 1 is an axial section taken through the head and top end of the ram;

Fig. 2 is a section taken on line 2—2 of Fig. 1 and including a side elevation of the ram;

Fig. 3 is a view taken on line 3—3 of Fig. 1;

Fig. 4 is a section through the ram taken on line 4—4 of Fig. 2;

Fig. 5 is an axial section through the ram taken on line 5—5 of Fig. 4;

Fig. 6 is a cross section through the ram base taken on line 6—6 of Fig. 5; and

Fig. 7 is a section through the release valve taken on line 7—7 of Fig. 6.

Before proceeding with a description of this invention, it is noted that, with the exception of features identified by reference numerals 57' and 57'a, all features identified herein by reference numerals under 150 constitute subject matter of the aforementioned copending application and are more fully described therein under the same reference numerals.

In the present jack, the elevating and lowering means is a hydraulic ram mechanism 151 having a vertical axis and mounted on a carriage 153 that moves on caster wheels 155 that swivel on vertical axes. The ram 151 is actuated by a foot pump lever 157 which, as hereinafter described in detail, may be turned through a wide angle so that it may be reached by an operator from any side of the unit. The top end of the ram 159 fits in a socket 161 and is held therein by a pin 163 that fits in a circumferential groove 164 in the ram end, this arrangement permitting relative rotation between the ram and the wall of the socket.

The socket 161 is formed in the jack head 165 and, more particularly, in the base casting 167 thereof. Pivotally mounted on pins 169 which fit in arms 171 of the casting 167 is a casting 57' which corresponds to the base casting 57 of the prior application. The axis of pins 169 is located at the top of socket 161 and offset from the axis of the socket but parallel to the overhanging tracks 83 which are secured to surfaces 85 on the casting 57' by the bolts 87.

The tracks 83 are arcuate about an axis which is located above the jack and which corresponds to the general location of the axes of transmissions carried thereon. The saddle support member 82 fits between the inside edges of the tracks 83 and carries two sets of rollers on each side. Each set of rollers includes an upper roller 89 that rides on top of the track 83 and a lower roller 91 which is engageable with the underside of the overhanging portion of a track 83, the upper rollers being mounted on pins 93 and the lower rollers on pins 95.

The member 82 is moved on tracks 83 by rotation of screw shaft 97 that is journaled in sections 98 formed on opposite sides of the casting 57'. Turning of handwheel 101 causes axial movement of block 103 which is threaded on the shaft 97 and this moves links 107 which are pivoted to the block 103 and to pins 93 and 95 at one side of the member 82. Movement of the block 103 therefore moves the rollers and member 82 on the tracks 83.

The top of the member 82 has a surface 111 which receives and supports various types of saddles or cradles which, in turn, directly receive and engage the object to be lifted. The saddle 113 illustrated has a base plate 115 that is secured to the surface 111 by bolts (not shown) and has four arms 121 radiating from the plate 115. Work rests 123 slide on the arms, and may be clamped in desired positions thereon, and contact the transmission in the desired locations. Slots 147 permit a cable sling to be easily latched in place. It will be appreciated that while rests 123 adapt the saddle to many objects, particular objects may require special fixtures and that these can be readily mounted on member 82.

The foregoing description shows how the saddle 113 may be moved about an axis spaced above it, i. e., axis of tracks 83. The saddle 113 can also be tilted about the axis of pins 169 and this also tilts the axis of the tracks 83. For this purpose, the base 167 has a yoke 173 extending downwardly and outwardly at an angle to the bore 161 and this pivotally mounts the screw block 175 adjacent its lower end. A screw shaft 177 threads through the block 175 and is journaled in a suitable bore in a rock shaft 179 mounted between and secured to the extremities of extended side arms 57'a on the casting 57'. A nut 181 and suitable collars 183 secure the axial position of the screw shaft 177 on the rock shaft 179 so that upon rotation of the shaft 177 via the crank handle 185 the movement of the shaft in the block 175 will exert a push or pull on the rock shaft 179 to cause the casting 57' and the saddle mounted thereon to tilt about the axis of the shaft 169.

The hydraulic ram 151 has several novel features including the aforementioned rotary foot pump lever 157 and also a foot-operated release valve lever 301 that may be reached from positions covering a wide angle of operations.

The ram 159 has a piston head 303 at its lower end which slides in sleeve cylinder 305 and carries a stop sleeve 307 encircling the ram. The cylinder 305 fits in a seat formed for it in the base block 309 and an O-ring 311 separates the seat from an annular support ring 313 that is also fitted into a seat 312 in the block 309. The ring 313 has a relieved bottom face to provide space above the seat 312 and has an aperture 314 therein to allow fluid leaking by the O-ring 311 to flow into the annular oil reservoir 315 that surrounds sleeve 305 and is encased by the outer cylinder 317 of the ram. The cylinder 317 threads into the block 309 as shown at 319 and its bottom presses on the ring 313. An O-ring and angular stamping assembly 321 retard leakage through the threaded joint 319.

At the top of the ram unit an annular head 323 is threaded on the outside of the top of cylinder 317 and seats a bearing sleeve 325 through which the ram 159 slides, the sleeve 325 being provided with suitable O-rings 327 to prevent leakage. Such leakage as may take place is by-passed through port 329 in bearing 325 and passages 331 in the head 323 back to the reservoir 315 around the outside of sleeve 305 which seats in the bearing 325 as shown at 333. Vent and filler screws 335 for the reservoir 315 are provided in cylinder 317 near the head 323.

In addition to carrying the ram and ram cylinder proper, as just described, the block 309 also carries the foot pump 337, operated by pedal 157, and a release valve 339, operated by treadle 301.

The foot pump 337 includes a sleeve cylinder 341 for the piston 343 which is threaded at 345 into the block 309. The piston 343 slides in the bore 347 formed by the cylinder 341 and is of cylindrical shape with a closed top end 349 and has suitable packing to prevent leakage. A coil spring 351 fits inside the piston 343 and bears on the top 349 to urge the piston out of the cylinder 341. The spring 351 sits in a recess 353 provided for it in the block 309 and is mounted on a guide pin 355. The foot lever 157 is pivoted to and between lugs 357 by a pin 359, the lugs being formed on a support 361 which rests on annular shoulder 363 of the block 309 and rotates about cylinder 341. The flange 365 on the cylinder 341 prevents the support 361 from rising off the cylinder. The lever 157 has ears 367 between and to which is pinned a roller 369 that bears on the top 349 of the piston 343 to force it down when it is desired to put oil from the reservoir beneath the ram 159. Up and down motion stops 371 and 373, respectively, for the lever 157 are formed on the support 361.

The release valve 339 releases pressure in the ram cylinder 305 to allow the ram 159 to descend at a moderate rate. It is operated by a U-shaped strip 301 that serves as a foot treadle and which is pivoted by bolts 375 near the ends of its legs to stanchions 377 formed on the top of the block 309. A torsion spring 378 connected to a stanchion 377 and a leg of the treadle biases it upwardly and the extended ends 380 of the treadle limit the extent of this movement as indicated in Fig. 2. It will be observed that the foot treadle 301 is wide and long and can therefore be readily reached from positions falling within a wide arc about the ram axis. The left leg of the treadle 301 has a bracket or clip 379 rigidly secured to an intermediate portion thereof so that it engages the top end of a plunger valve 381 in the release valve 339. The plunger 381 slides in a bore 383 that is formed in one end corner of the block 309. It is held in the bore and packed by a fitting 385 which threads into the block over an O-ring 387 and which has a shoulder 389 to engage a shoulder on the plunger and thereby prevent its escape. The bottom of bore 383 is enlarged to form a valve seat and chamber 391 for ball check 393 and this, in turn, is enlarged into chamber 395, the walls of which threadably receive a closure plug 397. The plug 397 has an internal opening which receives the end of a coil spring 399 that serves to press the ball check against the bottom of the plunger 381 and both of them upwardly against the valve seat 391 and the treadle 301, respectively. A passage 401 drilled in the block 309 is in communication with pressure beneath the ram 159, as will appear hereinafter, and opens into the chamber 395, there being a slight overlapping of this opening with the seated ball check 393 as shown in Fig. 7. A passage 403 opens into the bore 383 above the valve seat 391 and its axis is on a level with the radial seat 312 for support ring 313. The passage 403 is shown drilled on a radius to the axis 405 of the ram cylinder and it opens into the seat 312 so that fluid flowing through it reaches the space beneath the relieved bottom of ring 313 and then passes through aperture 314 into the bottom of oil reservoir 315. Fluid from passage 401 reaches the passage 403 by flowing upwardly in bore 383 around the sides of the plunger 381 when the latter is depressed by the foot treadle 301 to unseat the ball check 393. It is apparent that the passages through which the oil must flow before it reaches the reservoir are rather restricted so that the ram 159 will descend slowly.

The block 309, which as already described carries the ram cylinder, the foot pump assembly 337, and the release valve assembly 339, has a bottom surface 405' which is ground flat and therefore serves to locate the axes of the various assemblies. In assembly of the jack the surface 405' rests on the horizontal flanges of spaced angle bars 407 that are welded at their ends to central sections 409 of spaced tubes 411. The four ends 413 of the tubes 411 diverge outwardly and carry the caster wheels 155 which therefore serve as a sturdy, mobile support for the mechanism. The ends of the block 309 are bolted to the vertical flanges of the angle bars as shown at 415, readily machined projecting pads 417 being formed at one end of the block whereby the blocks may be accommodated to variations in the distance between the vertical faces of the bars 407. It is evident that the block 309 and the parts carried by it may be readily unbolted for shipping purposes from the carriage structure formed by the tubes 411 and angle bars 407.

In operation, depression of the foot pump lever 157 drives the piston 343 down and fluid in cylinder bore 347 is forced out through a horizontal passage 419 drilled in the block 309 to the right of axis 405 and opening into recess 353. The passage 419 is crossed by a horizontal passage 421 located on one side of the axis 405 and is intersected by a horizontal passage 423 located on the other side of the axis 405 so that fluid under pressure from the pump has three places into which it tends to flow. One of these, the right-hand branch of passage 421, is positively blocked by a ball check 425 which is driven by the pressure of the pump against a seat 427 formed around the reduced diameter passage 429 which is a continuation of passage 421. Another of these, the passage 423, is blocked by a ball check 431 that is pressed by a coil spring 433, acting through floating pin 435, against a seat 437 formed around passage 423. The spring 433 and pin 435 work in the bore 439, which is a continuation of passage 423, against an adjustment plug 441 that is threaded into the walls of the bore at 443. A vertical passage 445 opens into the bore 439 on a radius from axis 405 that corresponds to the radius of seat 312 and connects the bore with the relieved portion of ring 313 and with the reservoir 315. It thus is evident that if the pumping pressure on the fluid in passage 419 exceeds the setting of spring 439, as regulated by plug 441, the ball check 431 will unseat and allow fluid to flow via passage 445 to the reservoir. The ball check 431 and assembly therefore serves as an overload dump valve.

In normal operation, pressure will be below that with which the ball check 431 is held on seat 437 and all the oil will flow to the left in passage 421 to drive ball check 447 from its seat 449 around passage 421 against the resistance of spring 451. The spring 451 works in bore 453, an enlarged continuation of passage 421, and bears directly on the ball check 447 at one end and upon a floating pin 455 at the other end, the pin abutting against the closure plug 457 which is threaded at 459 into the walls of the bore 453. Another floating pin 461 is disposed between ball checks 447 and 425 and serves to keep ball 425 in the right-hand portion of passage 421.

There are two outlets to bore 453, one being the horizontal passage 401 which delivers oil to the release valve 339 and the other being a vertical passage 463 that opens into the bottom of the bore in which the ram 159 works. The passage 463 constitutes means for oil to enter and leave the space beneath the ram. Hence, when the foot lever 157 is pushed down, pressure will flow through it from passages 419 and 421 to lift the ram 159. When the foot treadle 401 is depressed to open the release valve 339, oil beneath the ram 159 will flow to the reservoir via passage 463, passage 401, and passage 403 as described above, to permit lowering of the ram and the load carried by it.

On the upstroke of foot pump piston 343 under the force of spring 351, the foot lever 157 being released, suction is created in the passage 419. This allows spring 451 as well as back pressure in bore 453 to seat ball check 447 and prevent escape of pressure from beneath the ram. The suction also unseats the ball check 425 so that the right-hand portion of passage 421 connects with passage 427. Passage 427 is a continuation of bore 465 which houses a strainer 467 held in place by plug 469 that is threaded into the block 309. A vertical passage 471 connects the bore 465 with the valve seat 312 beneath ring 313 and thus with the oil reservoir 315. It is now evident that the suction on the upstroke of piston 343 by unseating ball check 425 allows oil from the reservoir to flow into the pump cylinder 347. Thus, on the downstroke oil is again pumped under pressure into the space beneath the ram as already described.

The spaces 473 shown in Fig. 6 are cored-out sections of the block 309 which facilitate its manufacture and reduce its weight.

It will now be apparent that the hydraulic ram used in the transmission jack shown in Figs. 1-7 is foot-operated and because of the rotary foot pump lever 157 and wide release valve lever 301 can be operated from a wide variety of positions. These features free the operator's hands to manipulate hand wheel 101 and hand crank 185 as well as work rests 123. Thus, complete and easy maneuverability of a transmission is provided by the jack and it may be readily removed from an automobile or replaced.

The invention may be embodied in modified forms other than those shown herein by way of illustration, hence it is not intended to limit the invention specifically to the structures described above.

We claim:

1. In a hydraulic jack having a ram with a vertical axis, a load engaging head including a base piece having a ram receiving socket, a base member pivoted on the piece on a horizontal axis, screw shaft means between the piece and member for tilting the member on its pivot, tracks on the member curved about an axis above the head, a saddle movable on the tracks, and screw shaft means between the saddle and member for moving the saddle on the tracks.

2. In a transmission jack, a pressure fluid cylinder having a vertical axis and a ram movable up and down along said axis, a head having means adapted to engage and support a transmission with the axis of the transmission extending in a generally horizontal direction and substantially intersecting said vertical axis, said head including a base mounted on top of said ram so that the head is movable with the ram, said head including a saddle having a portion carrying said means, means mounting said saddle portion on the base for arcuate movement about an axis above said head and substantially coincident with said transmission axis, a handle operatively connected to said saddle to effect said arcuate movement, means mounting said saddle on said base for pivotal movement about a horizontal axis extending substantially normally to said vertical axis and to said axis of arcuate movement whereby pivotal movement of said saddle tilts said transmission axis to vary the angle thereof with said vertical axis, a handle operatively connected to said saddle to effect pivotal movement thereof, a carriage, said cylinder being mounted on said carriage, said carriage including legs radiating a substantial distance outwardly from the cylinder and having swivelly mounted caster wheels on the ends of said legs so that it is rollable in all directions, said cylinder including a pump mounted adjacent the bottom thereof, a foot operated lever operatively connected to said pump and rotatable through a wide arc, said cylinder including a release valve adjacent the bottom thereof, and a wide foot treadle operatively connected to said release valve.

3. In a hydraulic jack, a vertically extending cylinder containing a vertically movable ram, a valve block at the foot of said cylinder having a vertical aperture therein opening out of the top thereof in which said cylinder is mounted, said valve block containing apertures communicating with said cylinder and with said ram, a pump mounted in said valve block for supplying pressure fluid to said ram through certain of said apertures, a release valve in said block communicating with said cylinder and ram through certain of said apertures for relieving pressure on the ram, a carriage bolted directly to said valve block to render said jack mobile in various directions, said pump including a vertically reciprocating actuator, a sleeve mounted on said block for angular movement about the vertical axis of said actuator, and a foot operated lever carried by said sleeve and engageable with said actuator to vertically move the same in all of various angular positions of the sleeve.

4. The invention set forth in claim 3 including a treadle movably supported on the valve block and having a width substantially as great as that of the valve block, said treadle containing an abutment having an operative engagement with said release valve so that upon movement of said treadle said valve will be actuated.

5. The invention set forth in claim 3 and including a foot treadle movably mounted on the valve block and adjacent said pump, said treadle being substantially as wide as the valve block and having a portion operatively engageable with said release valve.

6. In a transmission jack, a transmission engaging head including socket means providing a socket with a vertical axis, a hydraulic cylinder having a vertical ram swivelly mounted in said socket, said head including a bracket pivoted to said socket means on a horizontal axis offset from said vertical axis, a hand operated member connected to said socket means and to said bracket for pivoting the bracket on the socket means, said head including a transmission engaging section mounted on the bracket for movement about an axis located above said head, a second hand operated member connected to and between said bracket and said section and moving said section about said axis, said hydraulic cylinder having at the foot thereof a valve block controlling operation of said ram and carrying a foot pump and a foot release valve, and carriage means for said cylinder and head secured directly to said valve block.

References Cited in the file of this patent

UNITED STATES PATENTS

| | | |
|---|---|---|
| 1,618,773 | Meyers | Feb. 22, 1927 |
| 2,165,095 | Frechette | July 4, 1939 |
| 2,368,192 | Bishop et al. | Jan. 30, 1945 |
| 2,420,910 | Richards | May 20, 1947 |
| 2,474,196 | Coltman | June 21, 1949 |
| 2,479,100 | Connor | Aug. 16, 1949 |
| 2,523,734 | Stephenson et al. | Sept. 26, 1950 |
| 2,524,085 | Saul | Oct. 3, 1950 |
| 2,561,242 | Stokes | July 17, 1951 |
| 2,583,114 | Monteith | Jan. 22, 1952 |
| 2,706,052 | Trautman et al. | Apr. 12, 1955 |